United States Patent [19]

Yoon

[11] Patent Number: 5,789,055
[45] Date of Patent: Aug. 4, 1998

[54] OPTICAL RECORDING MEDIUM AND A METHOD OF FABRICATING THE SAME

[75] Inventor: DooWon Yoon, Dongan-gu, Rep. of Korea

[73] Assignee: LG Electronics Inc., Seoul, Rep. of Korea

[21] Appl. No.: 693,024

[22] Filed: Aug. 6, 1996

[30] Foreign Application Priority Data

Apr. 13, 1996 [KR] Rep. of Korea ............... 1996 11144

[51] Int. Cl.$^6$ .............................................. B32B 3/00
[52] U.S. Cl. ................. 428/64.1; 428/64.2; 428/64.4; 428/64.5; 428/64.7; 428/913; 430/270.13; 430/495.1; 430/945; 369/283; 369/288
[58] Field of Search ............... 428/64.1, 64.2, 428/64.4, 64.5, 64.7, 913; 430/270.12, 270.13, 495.1, 945; 369/283, 288

[56] References Cited

U.S. PATENT DOCUMENTS 5,191,565  3/1993  Inoue et al. .................. 369/284
5,305,297  4/1994  Nishiuchi et al. ............ 369/116
5,505,835  4/1996  Sakaue et al. ............... 204/192.26

Primary Examiner—William Krynski
Assistant Examiner—Elizabeth Evans
Attorney, Agent, or Firm—John P. White; Cooper & Dunham LLP

[57] ABSTRACT

An optical recording medium of phase change improves the erase ratio and the repeat writing characteristic by coexistence of an amorphous phase and a crystalline phase at the stage of initiation so as to reduce the size of crystalline grain in a recording layer and a method of fabricating the same. The optical recording medium of phase change comprises: a substrate; a first dielectric layer deposited on said substrate; a recording layer deposited on said first dielectric layer; a second dielectric layer deposited on said recording layer; a reflection layer and a protective film formed sequentially on said second dieletric layer; said recording layer being consisted of $(GeSbTe)_x(In_ySb_{1-y})_{1-x}$; and a crystalline phase of said recording layer being a structure co-existing with a crystalline material of GeSbTe and an amorphous material of InSb.

7 Claims, 3 Drawing Sheets ring(A)   non-crystaline material(B)

OPTICAL RECORDING MEDIUM AND A METHOD OF FABRICATING THE SAME

BACKGROUND OF THE INVENTION

1. Field of the Invention

The present invention relates to an optical recording medium of phase change and more particularly to an optical recording medium of phase change which improves the erase ratio and the repeat writing characteristic by coexistence of an amorphous phase and a crystalline phase at the stage of initiation so as to reduce the size of crystalline grain in a recording layer and a method of fabricating the same.

2. Discussion of Related Art

As an optical recording medium of phase change, a optical disc detects the difference of reflectivity according to the structural change of a material and reproduces it into a signal, or transforms the structure of the material so as to give the difference of reflectivity for recording a signal through the phase change of a material.

For an effective phase change, a phase change of materials must be performed under the order that a laser beam with the diameter of 1 µm should be irradiated at a point on the disc for 100 ns when the beam passes through at the velocity of a material.

As an amorphous state structure can be obtained with a melting and quenching cooling treatment, it is necessary that the material has the structure of which the time required to come to the state of an amorphous is shorter than the time for radiation of a laser beam, and the time necessary for the rearrangement of atoms to obtain the state of a crystal is also very short.

The materials such as TeGeSbS and TeGeAs, etc. have been studied as an optical recording medium of phase change for many years, but they cannot be applied for practical use because of their limitations such as a low speed of crystallization and the cyclability less than ten thousand times despite of their excellent amorphizing characteristic.

Besides, although the material of GeTeSn series was developed to have the cyclability more than 10 thousand times, it is not suitable for an optical recording medium because it takes over 30 ns for a crystallization A typical optical recording medium of phase change is an alloy of Ge—Sb—Te ternary series.

As the above alloy has been used for a computer memory devices under the high speed recording environment of 10–20 m/s for a long time, scientists made efforts into a research for increasing the speed of crystallization of materials and finally they founded it out that the speed of crystallization for a material of GeTe—$Sb_2Te_3$ pseudo-Binary series reaches to about 30–100 ns.

A good-quality phase change disc for an excellent writing and erasing performance has been developed by using the above ternary alloy, but it has a problem that the erase ratio is decreased due to the weakening of signals according to a repeat recording, which results in a poor reliance compared with conventional optical discs.

Consequently, it is necessary to develop a novel material and a structure to prevent the heating of a record film so as to attain the cyclability for a back-up of computer data In addition to a repeat recording of an optical disc of phase change, the erase ratio is another problem in overwriting operation.

This erase ratio causes a heating of an amorphous mark owing to the growth of a crystalline grain according to repeat recording, and makes it impossible to get an effective reproduction of records.

For a conventional GeSble material, a careful observation of recorded marks by means of TEM reveals that the crystals around erased marks have the same size with each other and a ring A with a large grain exits around the erased mark as shown in FIG. 1.

An amorphous mark B is surrounded by this ring.

This ring is formed during the process of amorphousization through a melting and quenching treatment and the crystalline ring with a large grain causes a residuum in erasing operation. Moreover, the optical constant of an erased mark is different from that of the ring. The optical constant of a thin film of an optical disc of phase change depends on the size and the shape of a grain and the direction of a crystal.

Referring to FIG. 1, the diameter of a grain in the ring is about 80 nm which is large than twice the thickness of a conventional recording film. Accordingly, such crystal must have a shape of a plate.

On the otherhand, the crystals in a mark which are very tiny but not clear in shapes distribute at random Such difference in a morphology of a crystal changes the optical constant of a recording film.

If the interval between the two marks, for example, is reduced for a high-density record, the mutual interference between the adjacent marks has an influence on a reproduced signal, which decreases the amplitude of the reproduced signal.

Otherwise, if the ring around an amorphous mark is not affected by the reduction of interval between the ring and a mark, the reproduced signal of the mark and the residual signal of erased mark have to be reduced together. Accordingly, the erase ratio is not to be reduced despite the decrease in interval between the marks. But, the erase ratio for all kinds of discs is actually reduced according to the decrease in interval between the marks due to the residuum The residuum increases according to the reduction of the interval between the two marks because the thermal energy of the amorphous marks diffuses through the adjacent layers as they are cooled during recording and a strong transmission of heat occurs among the marks as the interval between the two marks is reduced, so that the rate of cooling of a amorphous decreases and such a decreased rate of cooling accelerates the growth of large grains.

When fabricating a mark by using the above-described conventional recording materials, there is a problem that the crystalline grain of a large ring shape grows around the amorphous mark, so that the optical constant changes and the erase ratio is reduced. And such growth of a crystalline grain also causes a weakening of a reproduced signal in a prior art, the reproduced signal is weakened by the interference between the two tiny marks for a high-density recording where the interval between the marks is reduced.

SUMMARY OF THE INVENTION

Accordingly, the present invention is directed to an optical recording medium of phase change and a method of fabricating the same that substantially obviates one or more of the problems due to limitations and disadvantages of the related art.

An object of the present invention is to provide an optical recording medium of phase change which improves the erase ratio and the repeat writing characteristic by coexistence of a non-crystalline and an amorphous phase at the stage of initialization so as to reduce the size of a crystalline grain in a recording layer, and a method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a optical recording medium of phase change comprises: a substrate; a first dielectric layer deposited on said substrate; a recording layer deposited on said first dielectric layer; a second dielectric layer deposited on said recording layer; a reflection layer and a protective film formed sequentially on said second dieletric layer; said recording layer being consisted of $(GeSbTe)_x(In_ySb_{1-y})_{1-x}$; and a crystalline phase of said recording layer being a structure co-existing with a crystalline material of GeSbTe and an amorphous material of InSb.

A method of fabricating an optical recording medium of phase change comprises steps of: forming a first dielectric layer on a substrate; forming a recording layer of a compound $(GeSbTe)_x(In_ySb_{1-y})_{1-x}$ which a crystalline phase of a thin film of said first dielectric layer co-exists with a crystalline material GeSbTe and an amorphous material InSb; forming a second dielectric layer on said recording layer; and forming sequentially a reflection layer and a protective film on said second dielectric layer.

It is to be understood that both the foregoing general description and the following detailed description are exemplary and explanatory and are intended to provide further explanation of the invention as claimed.

The present invention comprises a compositive ratio of a compound $(GeSbTe)_x(In_ySb_{1-y})_{1-x}$ of said recording layer is $0.1 \leq x \leq 0.7$, $0.2 \leq y \leq 0.8$.)

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF PREFERRED EMBODIMENT

Reference will now be made in detail to the preferred embodiments of the present invention, examples of which are illustrated in the accompanying drawings.

Figure 1:
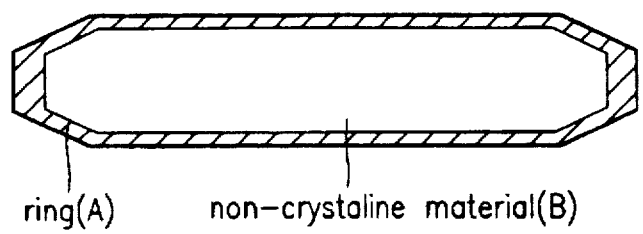
FIG. 1 is a plane view showing a conventional amorphous mark.
Figure 2:
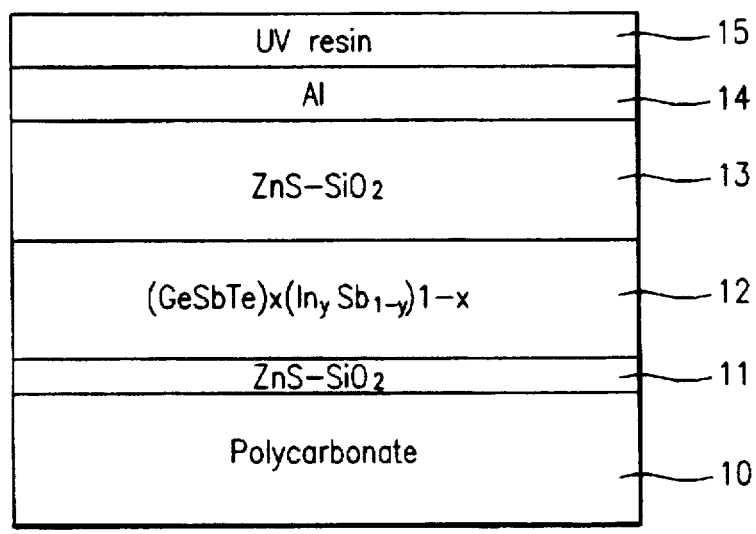
FIG. 2 is a sectional view showing a structure of an optical recording medium of phase change according to the present invention.
Figure 3:
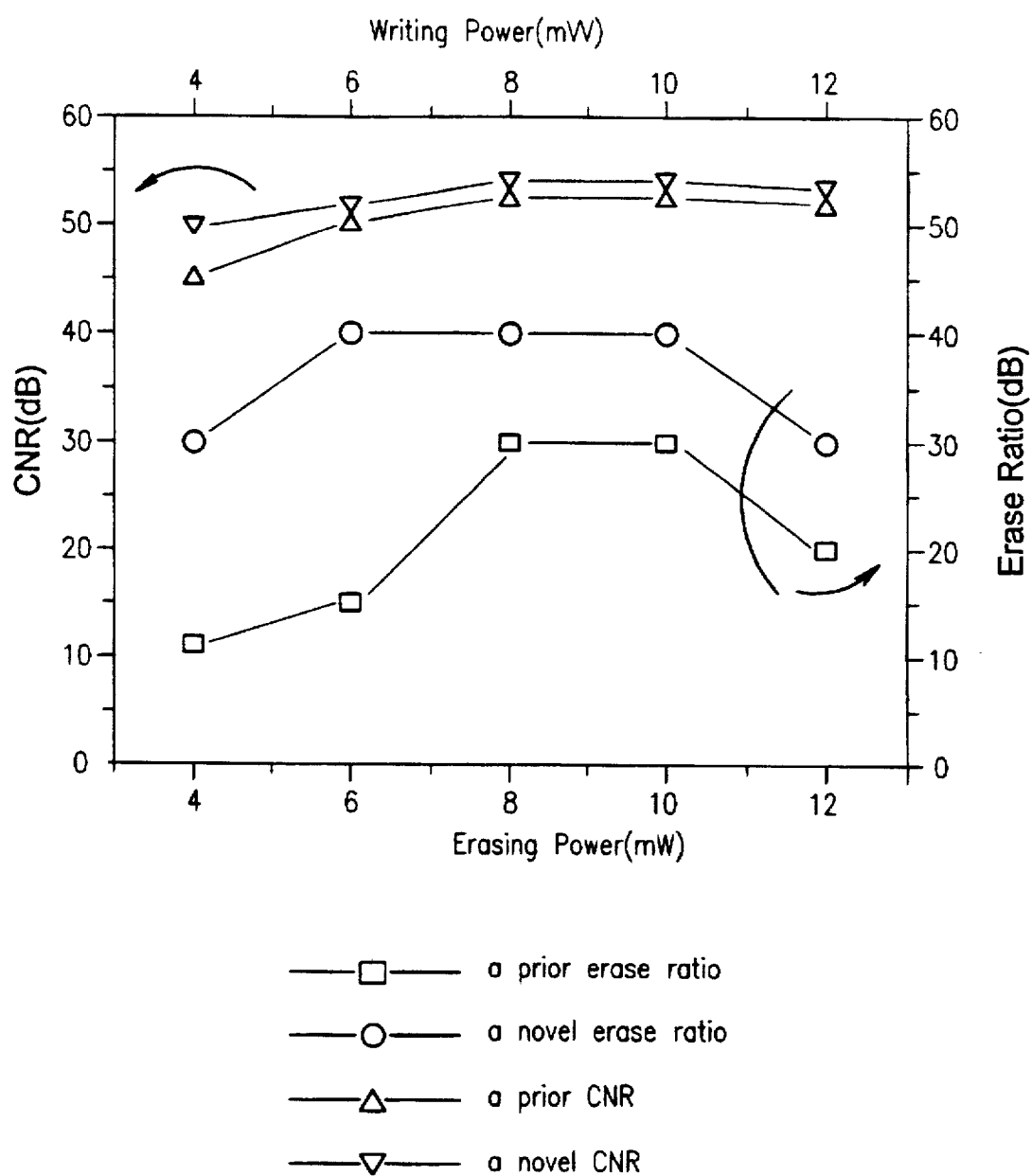
FIG. 3 is a graph showing a CNR and an erase ratio according to a conventional art and the present invention.

FIG. 2 is a sectional view of an optical disc showing an embodiment of the present invention.

The optical disc of the present invention is composed of a lower $ZnS$—$SiO_2$ dielectric layer 11 deposited on a polycarbonate substrate 10, a $(GeSbTe)_x(In_ySb_{1-y})_{1-x}$ recording layer 12 deposited on the lower dielectric layer 11 with mixing an amorphous material GeSbTe and an amorphous material InSb, an upper $ZnS$—$SiO_2$ dieletric layer 13 deposited on the recording layer 12, an Al reflection layer 14 deposited sequentially on the upper dielectric layer, and an UV resin protective film 15.

In an embodiment of the present invention, the thickness of the lower dielectric layer is 110–160 nm, the thickness of the recording layer 12 is 15–50 nm, the thickness of the upper dielectric layer 15 is 20–50 nm, the thickness of the reflection layer 14 is 80–150 nm.

With respective to an optical recording medium of the present invention as constructed above, a crystalline phase is a structure coexisting with the GeSbTe crystal material and the the InSb amorphous material.

Accordingly, since the amorphous materials of GeSbTe and InSb coexist in the recorded mark and the crystalline material GeSbTe and the amorphous material coexist in the erased mark, the amorphous material InSb grain efficiently prevents the growth of GeSbTe crystal grain, so that the size of GeSbTe crystal grain is remarkably reduced.

Figure 4:
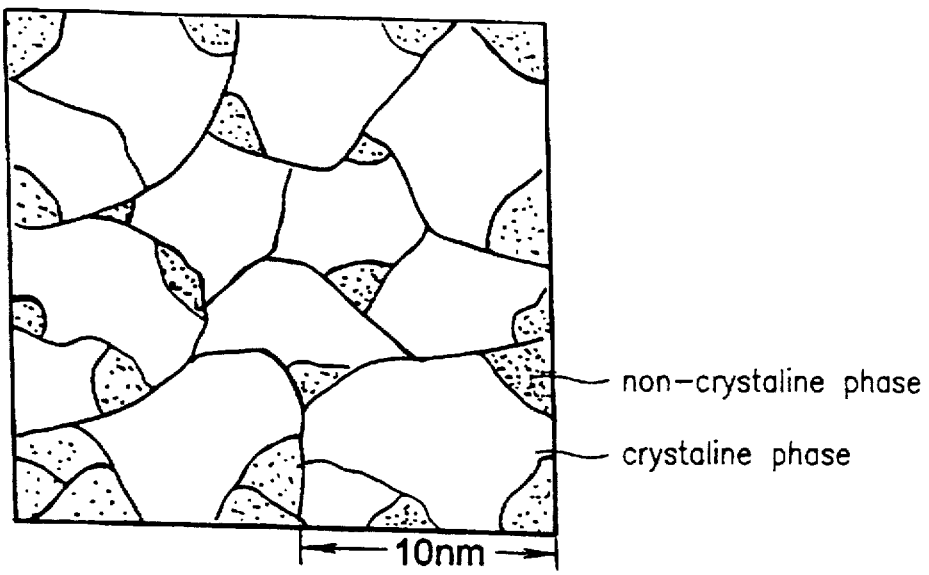
FIG. 4 is an example view showing a construction of a recording layer according to the present invention.

FIG. 4 is a preferable embodiment view of a grain of a writing material coexisting with the amorphous phase InSb and the crystal phase GeSbTe, since the GeSbTe crystal grain of a main writing material is below 10 nm and coexists with an amorphous phase, by reducing remarkably the size of grain than that of a conventional grain, the GeSbTe crystal grain doesn't form rings when writing.

That is, as the growth of the size of GeSbTe crystal grain is prevented by InSb, the fine organization is changed, the writing sensitivity of an optical recording material is good, and particularly, the erasing ratio increases greatly. At this time, GeSbTe substituted is a stoichiometric compound It is preferable to mix compounds near the line of Pseudo-Binary series GeTe—Sb2Te3, in a composition $(GeSbTe)_x(In_ySb_{1-y})_{1-x}$, it is desirably to compound in the range of $0.1 \leq x \leq 0.7$, $0.2 \leq y \leq 0.8$.

If the compositive ratio of x and y departs from the limited range, such desirable effect can not be expected In addition, if compounding B, C, and N by 0.1–0.3 wt % in a recording layer of $(GeSbTe)_x(In_ySb_{1-y})_{1-x}$, small grains of B, C, N are inserted into large grain of GeSbTe, so that it is desirable that the grain growth is prohibited There will be explained hereinafter with respect to a method of fabricating an optical recording medium of the present invention as described above.

First, the method of fabricating an optical recording medium comprises the steps of: forming the thickness of $ZnS$—$SiO_2$ to be 110–160 nm by RF sputtering so as to form a lower dielectric layer 11 on a polycarbonate substrate 10, next, co-sputterring Sb, antimony, on the target of GeSbIn by changing the pressure 1–3 m torr, and the power 100–200 W, to be $(GeSbTe)_x(In_ySb_{1-y})_{1-x}$ depositing the recording layer 12 on the lower dielectric layer 11 to be the thickness 15–30 nm, the recording layer 12 being formed with mixing the amorphous InSb in the crystal or amorphous state of GeSbTe, by controlling the co-sputterring ratio in the composition ratio of x, y, to be $0.1 \leq x \leq 0.7$, $0.2 \leq y \leq 0.8$, and then, forming the upper dielectric layer 13 of $ZnS$—$SiO_2$ to be the thickness 20–50 nm on the recording layer 12 by sputtering RF of the same strength with the lower dielectric layer 11, depositing an AL reflection layer 14 on the upper dielectric layer 13 within the range of 80 nm–150 nm and after that, depositing an UV resin, and forming the protective film 15.

For the recording layer 12 of the optical recording material fabricated as above, since a crystal phase in the thin film coexists with the GeSbTe crystal material and the InSb amorphous material when erasing the mark and an amorphous phase coexists with the amorphous materials GeSbTe and InSb when writing the mark, the InSb amorphous material efficiently prevents the growth of the GeSbTe crystal grain, so that the crystal grain size is remarkably reduced.

The fabricating method comprises steps of forming the recording layer 12 by co-sputterring Sb on the target of GeSbTe with changing the determined pressure and power, however, further can comprise a step of forming the recording layer 12 by co-sputterring In, InSb respectively corresponding to the target of GeSbTe or GeTe.

In addition, a reflection layer can be substituted by general other metals except Al, a protective film can be substituted by other resins except UV resin.

In using the mask structure according to the present invention, there are advantages that a writing sensitivity is good and an erasing ratio increases greatly due to reducing the grain size of a crystal material by means of the mixed crystal phase, and that a readout signal is improved even though the interval between the marks is narrow to record a high density, and a repeating record is excellent because of rapidly not changing an optical constant although the successive thermal cycling due to not growing the large crystal.

It will be apparent to those skilled in the art that various modifications and variations can be made in an optical recording medium of phase change and a method of fabricating the same of the present invention without departing from the spirit or scope of the invention. Thus, it is intended that the present invention cover the modifications and variations of this invention provided they come within the scope of the appended claims and their equivalents.

What is claimed is:

1. An optical recording medium of phase change comprising:

a substrate;

a first dielectric layer deposited on said substrate;

a recording layer deposited on said first dielectric layer;

a second dielectric layer deposited on said recording layer;

a reflection layer and a protective film formed sequentially on said second dielectric layer;

said recording layer being consisted of $(GeSbTe)_x (In_y Sb_{1-y})_{1-x}$; and said recording layer being a structure co-existing with a crystalline material of GeSbTe and an amorphous material of InSb;

wherein a compositive ratio of a compound $(GeSbTe)_x (In_y Sb_{1-y})_{1-x}$ of said recording layer is $0.1 \leq x \leq 0.7$, $0.2 \leq y \leq 0.8$.

2. The optical recording medium of phase change according to claim 1, wherein a compound $(GeSbTe)_x (In_y Sb_{1-y})_{1-x}$ of said recording layer is mixed with B, C, N by 0.1–0.3 wt %.

3. A method of fabricating a an optical recording medium of phase change comprising steps of:

forming a first dielectric layer on a substrate;

forming a recording layer of a compound $(GeSbTe)_x (In_y Sb_{1-y})_{1-x}$ which a crystalline phase of a thin film of said first dielectric layer co-exists with a crystalline material GeSbTe and an amorphous material InSb;

forming a second dielectric layer on said recording layer; and forming sequentially a reflecting film and a protective film on said second dielectric film;

wherein a compositive ratio of a recording layer of said optical recording medium is $0.1 \leq x \leq 0.7$, $0.2 \leq y \leq 0.8$.

4. The method of fabricating a an optical recording medium of phase change according to claim 3, wherein further comprising a step of co-sputterring Sb on the target of GeSbTe by changing the pressure 1–3 mtorr and power 100–200 W.

5. The method of fabricating a an optical recording medium of phase change according to claim 3, wherein further comprising a step of co-sputterring In on the target of GeSbTe by changing the pressure 1–3 mtorr and power 100–200 W.

6. The method of fabricating a an optical recording medium of phase change according to claim 3, wherein further comprising a step of co-sputterring InSb on the target of GeTe by changing the pressure 1–3 mtorr and power 100–200 W.

7. The method of fabricating an optical recording medium of phase change according to claim 3, wherein a compound $(GeSbTe)_x (In_y Sb_{1-y})_{1-x}$ of said recording layer is mixed with B, C, N by 0.1–0.3 wt %.

* * * * *